Figure 1:
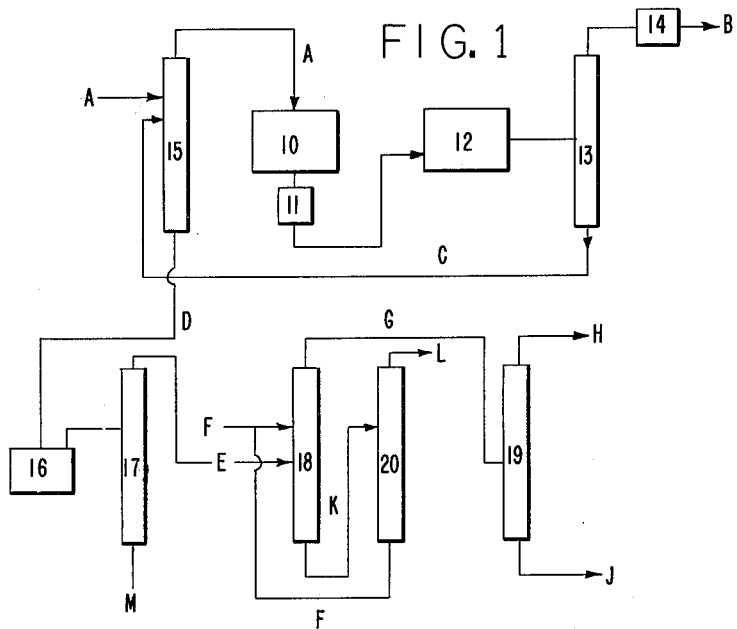

Aug. 20, 1963

H. A. WIIST 3,101,304

DISTILLATION PROCESS FOR FLUOROCARBONS

Filed April 28, 1960

INVENTOR
HERBERT A. WIIST

BY

ATTORNEY

United States Patent Office 3,101,304
Patented Aug. 20, 1963

3,101,304
DISTILLATION PROCESS FOR FLUOROCARBONS
Herbert Albert Wüst, Wilmington, Del., assignor to E. I. du Pont de Nemours and Company, Wilmington, Del., a corporation of Delaware
Filed Apr. 28, 1960, Ser. No. 25,362
17 Claims. (Cl. 202—39.5)

The process of the present invention relates to the separation of fluorocarbons, and, more particularly, to the extractive distillation of fluorocarbons.

Fluorocarbons, i.e., compounds of carbon and fluorine which may also contain other elements, such as hydrogen and chlorine, and particularly, perfluorocarbons, i.e., compounds consisting solely of carbon and fluorine, are highly useful as refrigerants and solvents. The unsaturated fluorocarbons are extremely useful monomers which on polymerization give rise to high molecular weight resins having outstanding corrosion- and heat-resistance. The most useful of these completely fluorinated hydrocarbons are tetrafluoroethylene and hexafluoropropylene as monomers, and perfluorocyclobutane as a solvent and refrigerant. One of the preferred methods of preparing tetrafluoroethylene is by pyrolysis of chlorodifluoromethane at temperatures above 700° C., as disclosed in greater detail in U.S. 2,551,573, issued to Downing et al. on May 8, 1951. The Downing et al. method results in the production of a large number of fluorocarbons in addition to tetrafluoroethylene. These compounds include hexafluoropropylene, perfluorocyclobutane, trifluoromethane, difluoromethane, chlorotrifluoromethane, perfluoroisobutylene, dichlorodifluoromethane, chlorotrifluoroethylene, dichlorotetrafluoroethane, chlorotetrafluoroethane, chlorohexafluoropropane, a homologous series of compounds $CHF_2(CF_2)_nCF_2Cl$ ($n$ up to 13), and a number of other compounds which have only to date been identified by their location on a gas chromatogram. Of these compounds, hexafluoropropylene and perfluorocyclobutane are highly useful perfluorocarbons. Heretofore, it has been necessary to discard these two highly useful perfluorocarbons, since it was impossible to separate these compounds from the other higher boiling fluorocarbons by either distillation or absorption, in view of azeotropes formed between the desired perfluorocarbons and the remaining fluorocarbons, their exceedingly close boiling points and their inertness to absorption. In another method, tetrafluoroethylene is produced by pyrolysis of bromodifluoromethane. Similar to the pyrolysis of the chlorine analog, the pyrolysis of the bromodifluoromethane produces a large number of fluorocarbons in addition to the more valuable perfluorocarbons, tetrafluoroethylene, hexafluoropropylene and octafluorocyclobutane. As in the case of the chlorine analog, the pyrolysate contains a number of compounds which form azeotropes with the desired perfluorocarbons, or boil so close to the perfluorocarbons that separation by distillation is impossible. The azeotropes formed in the bromodifluoromethane pyrolysis are, however, formed with different fluorocarbons than those formed with the chlorine analog.

It is, therefore, one of the objects of the present invention to separate perfluorocarbons from fluorocarbons by a simple, economic and novel method. It is another object to prepare perfluorocarbons. A further object is to purify perfluorocarbons. Still another object is to separate tetrafluoroethylene, hexafluoropropylene and octafluorocyclobutane from close boiling, or azeotrope forming fluorocarbons. Other objects will become apparent hereinafter.

In accordance with the present invention, volatile perfluorocarbons are separated from volatile non-perfluorinated fluorocarbons, which, in addition to fluorine, contain at least one element selected from the class consisting of hydrogen and halogens having atomic numbers from 17 to 53 inclusive by extractive distillation. Compounds causing the separation of the perfluorocarbons from the close boiling or azeotrope forming fluorocarbons are aromatic hydrocarbons, halogenated aromatic hydrocarbons and halogenated aliphatic hydrocarbons in which the halogen has an atomic number of 17 to 53, and which are liquid at distillation conditions. The process of the present invention is based on the discovery that the volatility of fluorocarbons boiling close to the volatile perfluorocarbons, which generally have from 1 to 5 carbon atoms, or form azeotropes with the fluorocarbons, is so changed by the addition of the extractive distillation agents of the present invention, that the separation of these groups of compounds becomes a matter of simple distillation. The close boiling or azeotrope forming fluorocarbons generally also have from 1 to 5 carbon atoms. Examples of azeotropes of perfluorocarbons and fluorocarbons separated by the extractive distillation of the present invention are hexafluoropropylene and chlorodifluoromethane, perfluorocyclobutane and chlorotetrafluoroethane, hexafluoropropylene and bromodifluoromethane, perfluorocyclobutane and bromodifluoromethane, tetrafluoroethylene and difluoromethane, tetrafluoroethylene and trifluoromethane. Most of the close boiling fluorocarbon and perfluorocarbon compounds will be apparent from any table listing the physical properties of fluorocarbon and perfluorocarbon compounds; examples are trifluoroethylene and tetrafluoroethylene, dichlorodifluoromethane and hexafluoropropylene.

The process of the present invention is of particular utility in combination with processes for the preparation of such fluorocarbons as tetrafluoroethylene, hexafluoropropylene and perfluorocyclobutane. These compounds can be prepared by the pyrolysis of chlorodifluoromethane, bromodifluoromethane or by inorganic and organic fluoride arc processes known in the art.

The pyrolysis of chlorodifluoromethane gives rise, in addition to tetrafluoroethylene the major product, to a number of fluorocarbons higher boiling than tetrafluoroethylene. These higher boiling fluorocarbons include hexafluoropropylene, perfluorocyclobutane, perfluoroisobutylene, dichlorotetrafluoroethane, chlorotetrafluoroethane, chlorohexafluoropropane, a homologous series of compounds $CHF_2(CF_2)_nCF_2Cl$ ($n$ up to 13), and a number of other compounds which have only to date been identified by their location on a gas chromatogram. The higher boiling fluorocarbons also contain some of the starting material, chlorodifluoromethane, which, although having a lower boiling point, can only be separated in part from the higher boiling fluorocarbons due to the fact that it forms an azeotrope with hexafluoropropylene. The composition of these higher boiling fluorocarbons will vary with the pyrolysis conditions, but will, in general, contain about 50% of the useful perfluorocarbons, hexafluoropropylene and perfluorocyclobutane.

The pyrolysis of chlorodifluoromethane is carried out at temperatures of 4450° C. to 900° C., and, generally, at atmospheric pressure, although lower or higher pressures may be employed in the pyrolysis. The contact time of the pyrolysis feed in the furnace will vary from 0.05 to 5 seconds. The pyrolysis conditions will affect the conversion of the chlorodifluoromethane and also the composition of the pyrolysate. In general, with increasing pyrolysis temperatures and contact times, a higher conversion to the products mentioned is obtained. Increases in pyrolysis temperature and contact times will also lead to the formation of increased proportions of the higher boiling fluorocarbons and to a decrease in the proportions of tetrafluoroethylene. Thus, at 35% conversion, a yield of ~95% of tetrafluoroethylene is obtained and a yield of 5 to 7% of higher boiling fluorocarbons of which 50% is hexafluoropropylene and perfluorocyclobutane. At a 90% conversion of the starting material, a 30% yield of tetrafluoroethylene is obtained and a 70% yield of higher boiling fluorocarbons of which 50% is hexafluoropropylene and perfluorocyclobutane. The pyrolysis of bromodifluoromethane is carried out under substantially similar conditions and gives rise to substantially similar results.

The separation of the higher boiling fluorinated hydrocarbons by straight distillation was found to be impossible, since the various fluorocarbons formed azeotropes which prevented their separation. Thus, it was found that difluorochloromethane and hexafluoropropylene formed an azeotrope, and that perfluorocyclobutane and chlorotetrafluoroethane formed an azeotrope. Since the relative volatility of these compounds is one or close to one, their substantial separation can not be achieved directly by distillation, the only separation possible being as to excess quantities present beyond the quantities in the azeotrope composition. A further difficulty is the close boiling points of some of the fluorocarbons obtained from the pyrolysis. Thus, chlorotrifluoroethylene and dichlorodifluoromethane boil within 2° C. of hexafluoropropylene. The addition of the described aromatic hydrocarbons or halogenated aromatic and aliphatic hydrocarbons was found to rearrange the volatilities of the interfering fluorocarbons in such a manner as to greatly enhance the volatility of the tetrafluoroethylene, hexafluoropropylene and perfluorocyclobutane, thereby preventing the formation of the undesirable azeotropes. The preferred aromatic hydrocarbons and halogenated, aliphatic or aromatic hydrocarbons used in the present invention are hydrocarbons which are liquid under distillation conditions and include benzene, toluene, xylene, ethylbenzene and other alkyl-substituted benzenes, as well as chlorobenzene, p-dichlorobenzene, 2,4,6-trichlorobenzene, o-chlorotoluene, p-chlorotoluene, and o-chloroethylbenzene, methylene chloride, chloroform, methyl chloride, carbon tetrachloride, dichloroethylene, tetrachloroethylene and trichloroethylene. The quantity of the hydrocarbon to be employed can be varied over a wide range. Even the addition of small quantities of the hydrocarbon will significantly affect the volatility. In order to readily facilitate the separation of the higher boiling fluorinated hydrocarbons obtained from the pyrolysis, after removal of starting material and tetrafluoroethylene, it is preferred to employ from 1 to 25 times the weight of the hydrocarbons as compared to the weight of the higher boiling fluorocarbons. Thus, the relative volatilities at various pressures of a mixture employing three parts of toluene, one of the preferred hydrocarbons, and one part of the higher boiling fluorocarbons obtained from the pyrolysis of chlorodifluoromethane, is illustrated with respect to the major components of the mixture in Table I below. The mixture of hexafluoropropylene and perfluorocyclobutane is taken as the most volatile component.

TABLE I

| Component | Relative Volatility | | | |
|---|---|---|---|---|
| | Atom. pressure | 15 p.s.i.g. | 30 p.s.i.g. | 45 p.s.i.g. |
| Chlorotrifluoroethylene | 3.1 | 2.78 | 2.25 | 2.05 |
| Dichlorodifluoromethane | 2.83 | 2.72 | 2.42 | 2.11 |
| Chlorotetrafluoroethane | 7.8 | 6.06 | 4.5 | 3.75 |
| Chlorohexafluoropropane | 22.0 | 15.6 | 9.85 | 7.94 |

Table II shows the relative volatility of the major pyrolysis products with xylene and chlorobenzene indicating their suitability in the process of the present invention, and also points out the reason why toluene is the preferred separating agent. The measurements were obtained at atmospheric pressure using a mixture comprising three parts of the hydrocarbon and one part of the higher boiling fluorocarbons. The mixture of hexafluoropropylene and perfluorocyclobutane is taken as the most volatile component.

TABLE II

| Component | Relative Volatility | |
|---|---|---|
| | Xylene | Chlorobenzene |
| Chlorotrifluoroethylene | 2.32 | 1.99 |
| Dichlorodifluoromethane | 2.46 | 1.98 |
| Chlorotetrafluoroethane | 5.45 | 3.48 |
| Chlorohexafluoropropane | 13.2 | 8.6 |

Relative volatilities of the azeotrope formed between hexafluoropropylene and chlorodifluoromethane and the effect of various extractive distillation agents at increasing concentrations is shown in Table III, in which hexafluoropropylene is taken as the most volatile component.

TABLE III

[Azeotrope: Hexafluoropropylene 10 mol percent; chlorodifluoromethane 90 mol percent]

| Moles of Solvent/Mole of Azeotrope | Relative Volatility | | |
|---|---|---|---|
| | Chloroform | Carbon Tetrachloride | Toluene |
| 0 | 1.0 | 1.0 | 1.0 |
| 1 | 1.52 | 1.29 | 1.82 |
| 2 | 2.01 | | |
| 3 | 2.27 | 1.52 | 2.75 |
| 5 | 2.43 | | |

The relative volatilities of compounds which distill close to tetrafluoroethylene and form azeotropes with tetrafluoroethylene are shown in Table IV. Compounds which form azeotropes with tetrafluoroethylene or boil close to tetrafluoroethylene, generally do not constitute a significant problem when the pyrolysis is carried out using chlorodifluoromethane. However, the fluorocarbons listed below are formed in substantially greater concentrations when the pyrolysis is carried out with bromodifluoromethane. Using bromodifluoromethane, the extractive distillation of the present invention is important to the preparation of pure tetrafluoroethylene. The relative volatilities shown in Table IV were obtained at atmospheric pressure using three parts of solvent per part of the fluorocarbon mixtures. This table further shows that normal hydrocarbons do not give rise to an increase in relative volatilities. Tetrafluoroethylene is used as the most volatile component.

TABLE IV

| Components | Solvents | | | |
|---|---|---|---|---|
| | Methylene Chloride | Toluene | 66% Methylene Chloride, 34% Toluene | n-Hexane |
| | Relative Volatilities | | | |
| Trifluoroethylene | 3.2 | 4.5 | 3.1 | 1.78 |
| Difluoromethane | 5.5 | 5.4 | 5.3 | .85 |
| Pentafluoroethane | 2.25 | 6.3 | | 1.16 |
| Trifluoromethane | 1.2 | 1.4 | | .93 |
| Chlorodifluoromethane | 13.0 | | | |
| Chloropentafluoroethane | 3.1 | | | |

Relative volatilities obtained with toluene at atmospheric pressure when used in a ratio of fluorocarbon mixture to toluene of 1:3 are shown in Table V. The fluorocarbon mixture employed contained the components formed in the pyrolysis of bromodifluoromethane. The relative volatilities shown were obtained with hexafluoropropylene and perfluorocyclobutane as the most volatile component. The table also includes the relative volatilities of fluorocarbon compounds, the structures of which have not been definitely established, but which are formed in the pyrolysis. The unknowns are designated by their retention time in the gas chromatography unit.

TABLE V

| Component | Relative Volatilities | |
|---|---|---|
| | Hexafluoropropylene as M.V.C. | Perfluorocyclobutane as M.V.C. |
| Bromotrifluoromethane | 2.0 | 2.4 |
| Unknown 7.3 | 2.2 | 2.65 |
| Unknown 11.4 | 2.35 | 2.85 |
| Unknown 12.3 | 2.7 | 3.3 |
| Tetrafluoroethane | 4.65 | 5.6 |
| Hexafluoropropane | 5.1 | 6.1 |
| Unknown 15.8 | 4.0 | 4.9 |
| Chlorotetrafluoroethane | 6.5 | 7.9 |
| Unknown 21.3 | 6.6 | 7.8 |
| Chlorobromodifluoromethane | 7.65 | 9.3 |
| Bromodifluoromethane | 8.46 | 10.3 |
| Unknown 37.0 | 10.6 | 12.9 |
| Bromotetrafluoroethane | 16.7 | 20.3 |
| Unknown 47.5 | 16.4 | 19.9 |
| Unknown 54.9 | 18.8 | 22.8 |
| Dibromodifluoromethane | 19.3 | 23.4 |
| Dibromotetrafluoroethane | 30.7 | 37.2 |

Figure 2:
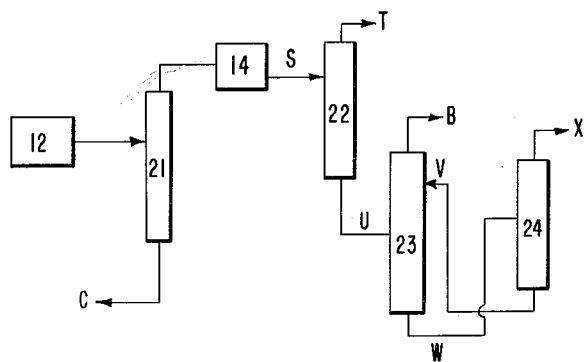

The process of the present invention is further illustrated by the attached schematic drawings showing, in FIG. 1, the process of the present invention as employed in the pyrolysis of chlorodifluoromethane using an aromatic hydrocarbon as the extractive distillation agent, and in FIG. 2, the modifications necessary to include an extractive distillation of tetrafluoroethylene with methylene chloride.

Chlorodifluoromethane A is charged into the pyrolysis furnace 10 where the formation of the fluorocarbons occurs. The reaction is generally carried out in a multiple tube furnace employing platinum-lined Inconel tubes, although other materials of construction, such as silver and carbon-lined steel or Inconel tubes, may be used. The chlorodifluoromethane may be preheated if desired. The operating conditions for the furnace have been described hereinabove. From the furnace 10 the reaction products are passed through a cooler 11 where the gaseous products are cooled to below 150° C. The cooled gases are fed to the cooler and compressor 12 where the gas is cooled to below 50° C. and compressed to about 200 to 250 p.s.i.g. Tetrafluoroethylene and hydrogen chloride are distilled off in column 13, maintained at a temperature of −25° C. at the head and 45° C. at the base of the column, and at a pressure of 225 p.s.i.g. The tetrafluoroethylene B is separated from the hydrogen chloride by passing it through a caustic scrubber 14. The residue from the distillation column containing the desired hexafluoropropylene and perfluorocyclobutane C is passed to column 15 where the unreacted starting material, chlorodifluoromethane, is separated from the residue of column 13 so far as it does not form the azeotrope with hexafluoropropylene and where additional chlorodifluoromethane A is charged to the system which is then fed to the pyrolysis furnace. The column is maintained at a temperature of 45° C. at the base and +7° C. at the head of the column, and at a pressure of 75 p.s.i.g. The residue from column 15 is passed to the storage tank 16 where the higher boiling fluorocarbons may be stored prior to their separation. The higher boiling fluorocarbons are passed from the storage tank 16 into a heels column 17 where compounds boiling higher than chlorohexafluoropropane (B.P. 20° C.) M are removed to avoid contamination of the aromatic hydrocarbon. The overhead from the heels column E passes to the extractive distillation column 18. The aromatic hydrocarbon F is charged to the column at a temperature of 0 to 50° C. higher than the head temperature of the column. The column can be maintained over a wide pressure range from 0 to 200 p.s.i.g., although pressures of about 50 to 75 p.s.i.g. are preferred with a temperature of 150° to 165° C. at the base and 14° C. at the head of the column. The overhead of the column, comprising essentially pure hexafluoropropylene and perfluorocyclobutane, G is passed to column 19 where the hexafluoropropylene H is separated by distillation from the perfluorocyclobutane J. The column is maintained at a pressure of 45 p.s.i.g. and at a temperature of −8° C. at the head of the column and +35° C. at the base of the column. The residue from column 18 containing the remaining higher boiling fluorocarbons and the aromatic hydrocarbon K is passed to column 20 where the aromatic hydrocarbon F is separated from the remaining high boilers L. The operating conditions of the column will vary with the aromatic hydrocarbon employed. The conditions are maintained such that the aromatic hydrocarbon F is recovered from the base of the column and the remaining fluorocarbons L are removed at the head of the column. The aromatic hydrocarbon is dried if necessary and then recycled to column 18.

FIG. 2 shows schematically the additions necessary to include in the pyrolysis process of FIG. 1 an extractive distillation of tetrafluoroethylene. As indicated above, this becomes necessary when the pyrolysis is carried out using bromodifluoromethane as the starting material. When using the extractive distillation with bromodifluoromethane, the pyrolysis is conducted in the same manner as with chlorodifluoromethane, but after the compressor 12, the distilling column 13 of FIG. 1 is operated at somewhat different conditions, i.e., at a pressure of 165 p.s.i.g. and a head temperature of −15° C. and, thus, becomes column 21 of FIG. 2. This permits more of the fluorocarbons boiling around tetrafluoroethylene and tetrafluoroethylene azeotrope to come over. The distillate S is passed again through scrubber 14 where hydrobromic acid is removed. From there the distillate is passed into gas stripper 22 operated at 155 p.s.i.g. and a head temperature of −20° C. The overhead product T comprises those gases boiling below tetrafluoroethylene and its azeotropes, such as trifluoromethane and hexafluoroethane. The residue U is passed into extractive distillation column 23 where the tetrafluoroethylene azeotrope is broken up. The extractive distillation agent, methylene chloride V, is pumped into the column near the top and above U. The column is operated at a pressure of 140 p.s.i.g. and a head temperature of −19° C. The overhead B comprises polymerization grade tetrafluoroethylene. The residue W is distilled in column 24, operated at a pressure of 60 p.s.i.g. and a temperature of −19° C., in which the extractive distillation agent is recovered and recycled and from which the remainder of the fluorocarbons X comprising principally trifluoroethylene and difluoromethane, are obtained.

The separation of hexafluoropropylene and perfluorocyclobutane is slightly different in the pyrolysis with bromodifluoromethane, since it is the latter which forms an azeotrope with the former, but will be apparent from the foregoing.

The invention is further illustrated by the following specific examples.

*Example I*

Into a 43″ long, 1″ in diameter, packed column (35–40 plates) operating at atmospheric pressure, was charged continuously at a rate of 150 g./hr., a composition comprising essentially as follows:

Mol percent
Hexafluoropropylene _____ 17.2
Perfluorocyclobutane _____ 25.4
Chlorodifluoromethane _____ 1.2
Dichlorodifluoromethane _____ 6.8
Tetrafluorochloroethane _____ 23.5
Hexafluorochloropropane _____ 8.3
Chlorotrifluoroethylene _____ 5.3
Unknowns+minor components _____ 12.3

This composition had been obtained by cracking chlorodifluoromethane at a temperature of 600° C., and at a pressure of 2 p.s.i.g., for a contact time of approximately 0.2 sec., and removing hydrogen chloride, tetrafluoroethylene and starting material so far as possible, from the pyrolysate. The composition was fed to the column 25 in. up from the base of the column. Toluene at −9° C. was fed from the top of the column at a rate of 1260 g./hr. maintaining a ratio of 3:1 of toluene to higher boiling fluorocarbons in the column which was refluxing at a 5:1 reflux ratio. The temperature of the column ranged from 72–74° C. at the base of the column to −20° C. at the head. The pressure of the column was atmospheric. Hexafluoropropylene and perfluorocyclobutane were taken from the head of the column at a rate of 72 g./hr. Analysis of the product indicated that it contained more than 99.99% of the perfluorocarbons. The yield from the extractive distillation was 98%.

Equal results can be obtained with aromatic hydrocarbons other than toluene, such as benzene, xylene and ethyl benzene, under slightly modified conditions.

Using the same column and the same supply of high boiling fluorocarbons, a batch distillation was conducted without addition of toluene. A reflux ratio of 10:1 was used.

The purest cut of hexafluoropropylene that could be obtained analyzed:

| | Mol percent |
|---|---|
| Hexafluoropropylene | 81.5 |
| Dichlorodifluoromethane | 9.2 |
| Chlorotrifluoroethylene | 6.2 |
| Miscellaneous | 3.2 |

The purest cut of perfluorocyclobutane that could be obtained analyzed:

| | Mol percent |
|---|---|
| Perfluorocyclobutane | 50.0 |
| Chlorotetrafluoroethane | 50.0 |

Example II

Into a 21′ x 2″ stainless steel column packed with ⅜″ Raschig rings (15–30 plates) maintained at 60 p.s.i.g. was fed toluene at a temperature of 60° C. and at the rate of 47 lbs./hr. A stream of high boiling fluorocarbons produced via the cracking of chlorodifluoromethane, as in Example I, was fed to the column 6′ from the base, at a rate of 7 lb./hr. This stream contained 48.4% by weight of useful perfluorocarbons (11.3% hexafluoropropylene and 37.1% perfluorocyclobutane by weight). Total analysis of the high boiling fluorocarbons fed to the column was:

| | Mol percent |
|---|---|
| Hexafluoropropylene | 7.50 |
| Perfluorocyclobutane | 33.28 |
| Chlorotrifluoroethylene | 4.18 |
| Dichlorodifluoromethane | 2.38 |
| Chlorodifluoromethane | 0.24 |
| Chlorotetrafluoroethane | 24.30 |
| Chlorohexafluoropropane | 13.83 |
| Unknowns | 14.32 |

The column was operated at a reflux ratio of about 2:1, base temperature was 110–120° C. For a period of 14 hrs., the overhead stream of useful perfluorocarbons (hexafluoropropylene and perfluorocyclobutane) was taken off at 3 lb./hr. Analysis indicated less than 100 p.p.m. of the other fluorocarbons in the overhead.

Recovery of useful perfluorocarbons was 87 weight percent of that fed to the column.

Toluene from the base of the extraction column (47 lb./hr.), containing 4 lb./hr. of non-useful fluorocarbons was fed to the toluene recovery column. Equipment used was a 20′ x 3″ diameter, stainless steel column, packed with ⅜″ Raschig rings, operating at 40 p.s.i.g.

The base temperature was maintained at the boiling point of toluene at that pressure, 160° C., and toluene was boiled up the column at a rate of not less than 50 lb./hr.

Toluene removed from the base of the column was free from significant contamination with fluorocarbons and was recycled to the extraction column for 8 hrs. without deterioration in the purity of the extraction column overhead.

Example III

Using the column described in Example I, crude tetrafluoroethylene, having the following composition,

| | Mol percent |
|---|---|
| Tetrafluoroethylene | 95 |
| Trifluoroethylene | 1 |
| Difluoromethane | 4 | was fed into the column 25 in. up from the base at the rate of 200 g./hr. Methylene chloride at −65° C. was fed from the top of the column at 600 g./hr., thus maintaining a ratio of 1:3. Reflux was at an approximate ratio of 1:1. The column was operated at atmospheric pressure. Temperature of the column ranged from +30° C. at the base to −75° C. at the top of the column. Analysis of the overhead showed the product to be greater than 99.99% pure tetrafluoroethylene. The same results are obtained when a chlorodifluoromethane pyrolysate containing 50 to 1000 p.p.m. of difluoromethane and 50 to 100 p.p.m. of trifluoroethylene is employed, or a bromodifluoromethane pyrolysate containing 5 to 20 mol percent of difluoromethane and 0.1 to 0.2 mol percent of trifluoroethylene is employed.

Example IV

Using the column of Example I, a mixture having the following composition,

| | Mol percent |
|---|---|
| Perfluorocyclobutane | 10 |
| Hexafluoropropylene | 10 |
| Bromodifluoromethane | 80 | was fed into the column 25 in. up from the base at a rate of 150 g./hr. Toluene was fed from the top of the column at a rate of 1000 g./hr. The reflux ratio was maintained at 5:1. Temperature of the column was 60 to 65° C. at the base and −20° C. at the top. The column was operated at atmospheric pressure. Hexafluoropropylene and perfluorocyclobutane removed from the top contained less than 0.1% of bromodifluoromethane.

It is to be understood that the relative volatility data, the pyrolysis processes described, and the examples represent specific embodiments of the invention. Various modifications of the invention disclosed will be apparent to those skilled in the art and are included herein. Thus, it will be apparent that other saturated and unsaturated perfluorocarbons can be separated by the process of the present invention from other fluorocarbons containing, in addition to fluorine, either chlorine, bromine, iodine or hydrogen. In general, the fluorocarbons and perfluorocarbons involved have up to 5 carbon atoms. Furthermore, it will be apparent that the invention has been principally described with respect to chlorinated and unhalogenated extractive distillation agents. Compounds, such as bromobenzene and bromoform and methylene iodide, may, however, also be employed, although they are not preferred, since they have lower stabilities than the chlorohydrocarbons.

The process of the present invention provides a simple, effective and economic method for the recovery of perfluorocarbons when formed in admixture with other fluorocarbons. The perfluorocarbons which heretofore had to be recycled or vented off because of the extreme difficulty or impossibility of separating them from by-products, can now be readily separated and recovered.

The commercial utility of the perfluorocarbons obtained by the process of the present invention as monomers, intermediates and solvents, has been well-established in the art, so that no further description thereof is deemed necessary.

This application is a continuation-in-part of Serial No. 755,030, filed August 14, 1958, now abandoned.

I claim:

1. A process for separating volatile perfluorocarbons of one to five carbon atoms from close boiling and azeotrope forming fluorocarbons of one to five carbon atoms containing, in addition to fluorine, elements selected from the class consisting of hydrogen, chlorine and bromine, by extractive distillation in the presence of a compound, liquid at distillation conditions and selected from the class consisting of benzene, alkyl benzenes, chlorinated aliphatic hydrocarbons, chlorinated benzenes and chlorinated alkyl benzenes.

2. A process for separating volatile perfluorocarbons of one to five carbon atoms from close boiling and azeotrope forming fluorocarbons of one to five carbon atoms containing, in addition to fluorine, elements selected from the class consisting of hydrogen, chlorine and bromine, by extractive distillation in the presence of an alkyl benzene liquid at distillation conditions.

3. A process for separating perfluorocarbons having up to 5 carbon atoms from fluorocarbons containing, in addition to fluorine, elements from the class consisting of hydrogen, chlorine and bromine, said fluorocarbons having up to 5 carbon atoms, by extractive distillation in the presence of a chlorinated aliphatic hydrocarbon, liquid at distillation conditions.

4. A process of separating perfluorocarbons of one to five carbon atoms, obtained by the pyrolysis of a compound selected from the class consisting of chlorodifluoromethane and bromodifluoromethane at a temperature of 450 to 900° C., from the fluorocarbons of one to five carbon atoms formed in said pyrolysis which comprises distilling close boiling fractions and azeotrope forming fractions of said pyrolysate in the presence of a compound selected from the class consisting of benzene, alkyl benzenes, chlorinated aliphatic hydrocarbons, chlorinated benzenes and chlorinated alkyl benzenes, liquid at distillation conditions, said compounds being present in greater than 1:1 weight ratios, and recovering pure perfluorocarbons.

5. The process of claim 4 wherein the fluorocarbons are formed by pyrolysis of chlorodifluoromethane.

6. The process of claim 4 wherein the fluorocarbons are formed by pyrolysis of bromodifluoromethane.

7. The process of claim 4 wherein the azeotropes separated are of the class consisting of tetrafluoroethylene with methylene fluoride and tetrafluoroethylene with trifluoromethane.

8. The process of claim 7 wherein the extractive distillation compound is an alkyl benzene.

9. The process of claim 8 wherein the alkyl benzene is toluene.

10. The process of claim 7 wherein the extractive distillation compound is a chlorinated aliphatic hydrocarbon.

11. The process of claim 10 wherein the chlorinated aliphatic hydrocarbon is methylene chloride.

12. The process of claim 4 wherein the azeotropes separated are of the class consisting of hexafluoropropylene with chlorodifluoromethane and hexafluoropropylene with bromodifluoromethane.

13. The process of claim 12 wherein the extractive distillation compound is an alkyl benzene.

14. The process of claim 13 wherein the alkyl benzene is toluene.

15. The process of claim 4 wherein the azeotropes separated are of the class consisting of perfluorocyclobutane with chlorotetrafluoroethane and perfluorocyclobutane with bromodifluoromethane.

16. The process of claim 15 wherein the extractive distillation compound is an alkyl benzene.

17. The process of claim 16 wherein the alkyl benzene is toluene.

References Cited in the file of this patent

UNITED STATES PATENTS

| | | |
|---|---|---|
| 2,339,160 | Dunn et al. | Jan. 11, 1944 |
| 2,384,449 | Benning et al. | Sept. 11, 1945 |
| 2,551,573 | Downing et al. | May 8, 1951 |

OTHER REFERENCES

"Technique of Organic Chemistry," volume IV, "Distillation," by Weissberger, Interscience Publ., Inc., New York, 1951 (pages 321, 338 and 339 relied upon).